June 2, 1931.  T. STENHOUSE ET AL  1,808,689
TRANSFER APPARATUS
Filed July 24, 1925    2 Sheets-Sheet 2

Inventors
Thomas Stenhouse
AND David Stenhouse

Patented June 2, 1931

1,808,689

UNITED STATES PATENT OFFICE

THOMAS STENHOUSE AND DAVID STENHOUSE, OF WASHINGTON, PENNSYLVANIA, ASSIGNORS TO HAZEL-ATLAS GLASS CO., OF WHEELING, WEST VIRGINIA, A CORPORATION OF WEST VIRGINIA

TRANSFER APPARATUS

Application filed July 24, 1925. Serial No. 45,891.

The invention relates to an apparatus for transferring articles from a moving glass forming machine to a conveyer or other point of deposit; and one of the objects of the invention is to synchronize the operation of the transfer apparatus and the ware forming machine, so that the transfer apparatus will become operative when it reaches a point tangential to the path of the travel of the ware forming machine, thereby preventing the semi-plastic ware from becoming pinched or deformed during the transfer from the forming machine to the point of delivery.

Another object of the invention is to provide a device of this character which is designed to be used in connection with either continuously or intermittently rotated ware forming machines, in the latter case, however, the transfer device being operative preferably during periods of motion rather than during the periods of dwell of the intermittently operated ware forming machine.

Another object of the invention is to provide means whereby a very sensitive adjustment may be had to limit the closing of the grippers to prevent pinching of the semi-plastic articles; and also to provide means for assuring a positive centering or alignment of the grippers.

A further object of the invention is to provide means for readily adjusting the vertical position of the transfer apparatus so that it is adapted for use with articles of different heights.

Further objects and advantages of the invention will be apparent from the following detailed description, when taken in connection with the accompanying drawings, in which.

Figure 1:
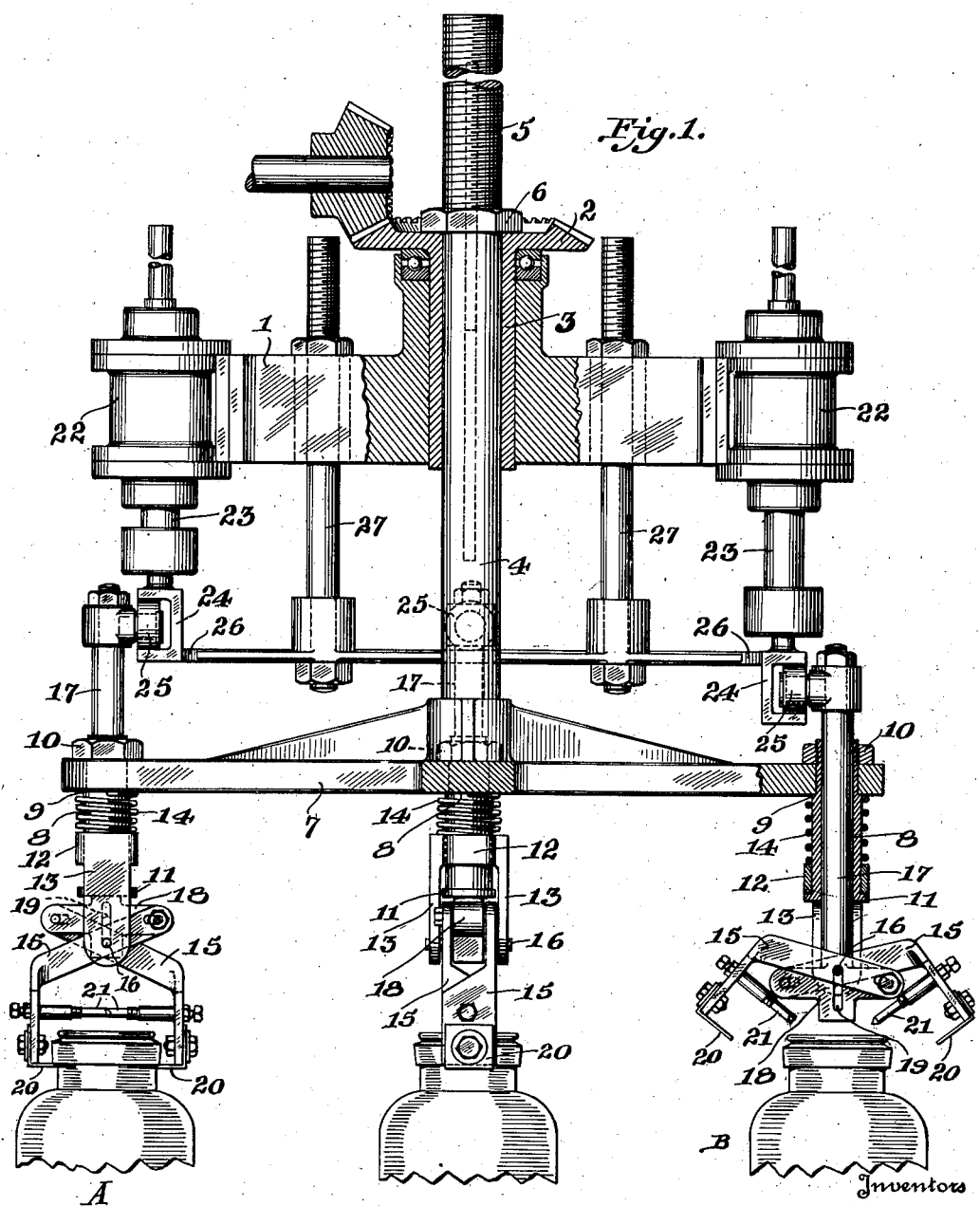
Figure 1 is an elevational view of the transfer apparatus; parts being broken away and parts being in section, for purpose of clearness.
Figure 2:
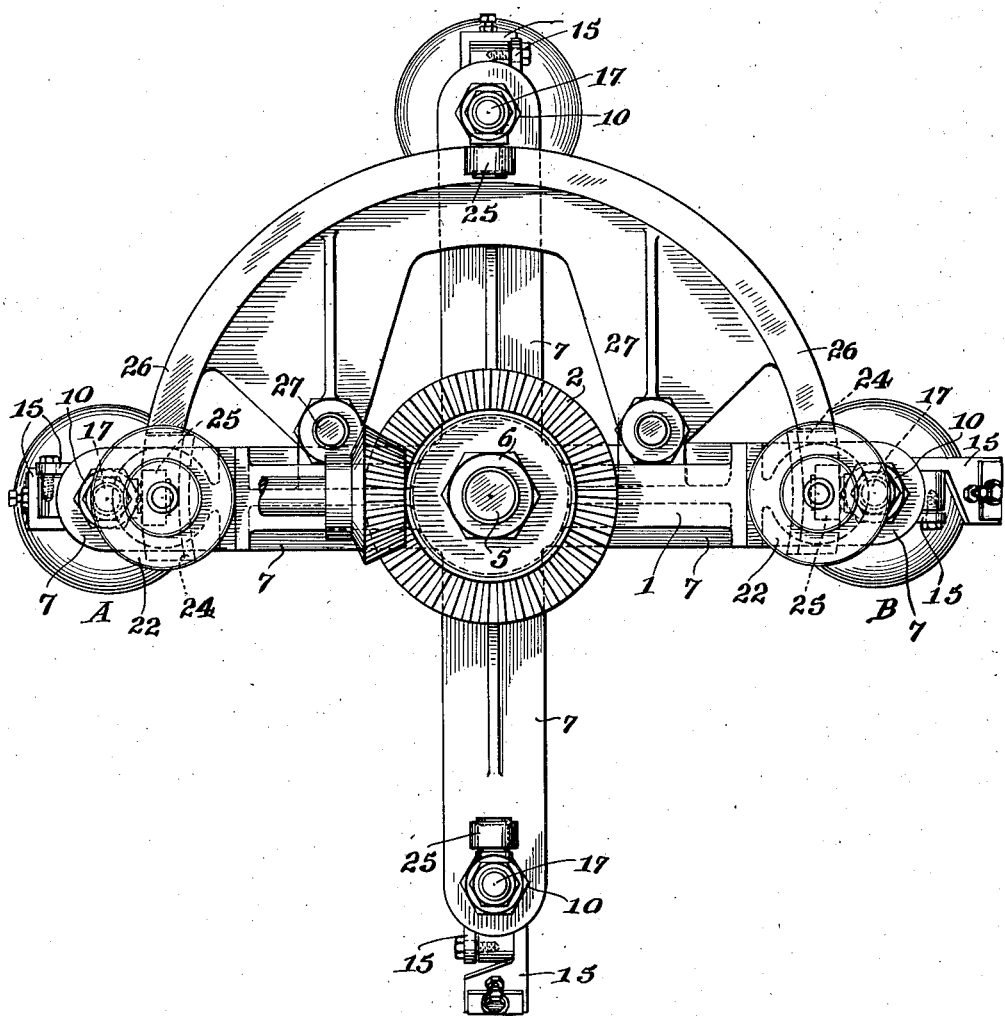
Figure 2 is a plan view of the transfer apparatus.
Figure 3:
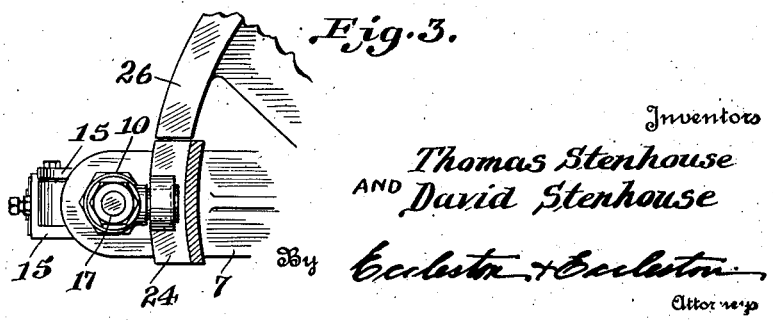
Figure 3 is a detail plan view showing the relation between the vertically reciprocable shoe and the horizontal track.

The frame carrying the transfer mechanism is indicated generally by numeral 1. This frame may be supported by a bracket from a glass forming machine, or it may be supported independently of the glass forming machine, and as the particular manner of supporting the apparatus is of no importance, it has not been deemed necessary to illustrate any supporting means. Further, the forming machine may be of any desired type, and accordingly it is believed to be unnecessary to illustrate such a machine; it being understood that the transfer apparatus is adaptable to use with any type of forming machine, whether operated continuously or intermittently, though in the latter case the transfer apparatus will operate to grip the articles during the periods of rotation, and in both cases the path of travel of the grippers will be substantially tangential, at some point, with the path of travel of the forming machine.

A bevel gear 2, having a downwardly extending sleeve 3, is anti-frictionally mounted for rotation in the frame 1, and keyed to this sleeve and gear is a vertically extending shaft 4, which has its upper portion screw-threaded, as indicated by numeral 5. A nut 6 engaging the screw-threads provides means for vertically adjusting the shaft 4 to adapt the mechanism to use with articles of varying heights.

Attached to the lower end of the shaft 4 is a spider 7, having, in the particular instance illustrated, four radially extending arms; and each arm carrying a glass gripping unit. Obviously the number of arms and transfer units will be varied in accordance with requirements.

The preferred construction of the transfer units will now be described, but as all of the units are identical in construction a description of one of them will suffice. In the following description reference is to be had particularly to Figure 1, and it will be noted, by reference to that figure, that one of the units is omitted for the sake of clearness; so that this figure shows the units at each side and the one at the back, but omits the one at the front; and the unit at the right is shown in vertical section.

A tubular member, indicated by numeral 100

8, is fixedly attached to the spider arm by any desired means, as by the shoulder 9 and nut 10; the lower end of said tubular member being provided with an annular flange 11. A sleeve 12, carrying depending arms 13, is slidably mounted on the tubular member 8, and this sleeve is normally pressed downwardly against the annular flange 11, by means of a coil spring 14, which is also mounted on the tubular member.

The grippers are indicated by numerals 15, 15, and these grippers are pivotally mounted between the depending arms 13, adjacent the lower ends thereof, by means of a pivot pin 16. A vertically reciprocable operating rod 17, is slidably mounted in the tubular member 8. This rod carries at its lower end a cross-head 18, to which the ends of the grippers 15 are pivotally attached; and the crosshead is provided with a slot 19, in which slot rides the pivot pin 16.

The operation of the gripper units is obvious. When the operating rod 17 is elevated it will first move the grippers to closed position to grip the articles. During this closing movement of the grippers the rod has travelled upwardly to the extent to bring the bottom of the slot 19 up to the pin 16; and further upward movement of the rod lifts the grippers and sleeve 12 against the pressure of the coil spring 14. The opening movement of the grippers is exactly the reverse; as the rod is first moved downwardly the coil spring will cause the sleeve and rod to move downwardly together, thereby retaining the grippers closed. Upon further movement, however, the sleeve strikes the annular flange 11, whereby further descent of the sleeve is prevented, and as the rod and crosshead carried thereby continue their downward movement the grippers will be opened to release the article.

The grippers may be provided with integral fingers for engaging the articles to be transferred; or fingers 20 may be detachably mounted on the grippers in the manner illustrated.

In previous transfer devices the semiplastic articles are often pinched by the grippers, and we have accordingly provided means which prevent such pinching action, and which means at the same time provide for adjusting the grippers to articles of different diameters. The particular means disclosed herein consists of pins 21 adjustably mounted in opposed relation in the grippers 15. By accurately adjusting these pins the inward movement of the gripper fingers may be so sensitively regulated that they will merely engage under a shoulder of the article to be transferred without even touching the body of the article, or they may touch the body of the article without exerting any pressure thereon. And obviously this adjustment also provides means for adapting the grippers to articles of various sizes.

It is also highly desirable that the grippers should always be aligned properly with each other. For this purpose we provide the end of one pin with a conical recess, and the end of the other pin with a conical point, and thus when the grippers approach their operative position the conical point will enter the conical recess and guide the grippers into perfect alignment. Of course, the conical recess and point are merely illustrative of the invention, and it will be understood that this feature of the invention contemplates any interlocking means which would guide the grippers into alignment.

Having described the manner of supporting and rotating the spider carrying the transfer units, the construction of the transfer units, and the manner in which the transfer units are operated by the reciprocation of the rod 17, we shall now describe the structure by which the rods 17 are reciprocated.

Mounted at each end of the frame 1 is a cylinder 22 and a piston rod 23, the latter carrying a shoe 24. The pistons are, of course, reciprocated in timed relation with the glass forming machine; and as the means for synchronously reciprocating the pistons involves no novelty it has been deemed unnecessary to illustrate herein such well known mechanism. The valves for operating the pistons are also timed so that as one piston is raised the other piston is simultaneously lowered.

Each of the rods 17 carries a roller 25 at its upper end; the rollers being adapted to travel into the shoes 24 during the rotation of the spider. A semicircular horizontally arranged track 26 is carried by the frame 1 by means of adjustable rods 27; and after the rollers have been raised by the shoe, in a manner to be described, they travel around the horizontal track until they enter the shoe at the opposite end of the track and are lowered thereby.

The operation of the apparatus may be described as follows: The spider 7 carrying the gripping units is continuously rotated in the manner described; and the path of travel of the gripping units is tangential to the path of travel of the glass forming machine (not shown) at the pick-up station A. As previously stated, the forming machine may be either continuously rotated or intermittently rotated, but if it is of the intermittently rotating type the transfer apparatus will operate to grip the articles during the periods of rotation rather than during the periods of dwell of the intermittently rotated forming machine, and in both cases the path of travel of the grippers will be substantially tangential, at some point, to the path of travel of the forming machine. It is thus seen that the apparatus is particularly adapted to transfer ware from the forming machine while both the forming machine and the transfer apparatus are revolving so that the semi-plastic articles do not have a swing imparted to them which tends to deform the articles.

It is well known that in the starting and stopping of the reciprocating types of transfer means as formerly used, the article was subjected to a jerk at each end of the stroke and the articles were thus often deformed. This is entirely eliminated by the present machine.

The delivery station B is indicated at the right of Fig. 1. The rod 17 has been lowered and the gripping elements have been swung to open position to release the article in the manner hereinbefore described. As the spider continues its rotation, parts will be retained in open position by means of the coil spring 14 until the unit reaches the pick-up station A. When the unit approaches the pick-up station A the shoe 24 at the left of Figure 1 will be in lowered position and the roller 25 will ride onto the shoe. The cylinder at the left of Figure 1 is now operated to lift the roller and the rod 17 carried thereby. The first portion of this upward movement of the rod closes the grippers, and the further upward movement of the rod lifts the grippers and the article bodily. The unit has, of course, continued its rotary movement during the operation and as the spider continues to rotate the roller rides off the shoe and onto the track 26 which maintains the grippers in elevated and closed position. As each gripping unit approaches station A the same operation is repeated. When the gripping unit reaches the opposite end of the semi-circular track 26 it will ride onto the shoe 24 at the right of Figure 1 and this shoe will be lowered by the operation of the cylinder 22 at the right of Figure 1 to thereby lower the grippers and to release the article at station B. It will be understood that when the rod 17 at station B is being depressed to lower and release an article the rod at station A is being raised to grip and lift an article. It is obvious that a transfer device of this character will operate to grip and transfer the articles without imparting any swing or jerk thereto for the reason that both the forming machine and the transfer apparatus are revolving during the pick-up operation; and that as the spider 7 is always continuously rotating in the same direction it is obviously impossible to impart any swinging action to the article at delivery station B.

It is also apparent that the present transfer apparatus is capable of easy operation with any forming machine, no matter what the rapidity of production of the forming machine may be, for the present transfer device may be provided with any desired number of gripping units.

It will be understood that the present device may be employed to transfer articles of varying height, and in order to adjust the apparatus for articles of different height it is only necessary to raise or lower the rod 4 carrying the spider 7 by means of the nut 6. It will also be understood that the apparatus is adaptable for use in transferring articles of varying diameter, for the extent of closing of the grippers may be determined by the position of the adjustable pins 21, 21; and this adjustment also prevents the gripping fingers from exerting sufficient pressure on the body of the article to injure the same. Further, pins 21, 21 are so constructed that they will guide the grippers into perfect alignment.

The apparatus disclosed herein may be changed and modified in numerous respects and all such changes and modifications we aim to include in the following claims.

What we claim as new and desire to secure by Letters Patent is:

1. A transfer apparatus including a continuously rotating arm, a gripper unit carried by the arm, and means for operating the grippers during the continued rotation of said arm, said means including a vertically movable shoe and a roller adapted to be brought into cooperative relation therewith, said shoe being of sufficient length to permit operation of the grippers during their continued travel.

2. A transfer apparatus including a continuously rotating arm, a gripper unit carried by the arm, and means for operating the gripper unit during the continued rotation of the arm, said means including two vertically movable elements brought into cooperative relation for a sufficient period of time to operate the grippers during their continued travel.

3. A transfer apparatus including a continuously rotating arm, a gripping unit carried by the arm, a vertically movable shoe adapted to be engaged by said gripping unit, said shoe being of sufficient length to permit cooperation with the gripper unit while the latter continues to travel, and means for moving said shoe to close the grippers during the continued rotation of said arm.

4. A transfer apparatus including a continuously rotating arm, a gripping unit carried by the arm, a vertically movable shoe adapted to be engaged by said gripping unit, said shoe being of sufficient length to permit cooperation with the gripper unit while the latter continues to travel, and means for moving the shoe to close the grippers and to lift the grippers bodily during the continued rotation of said arm.

5. A transfer apparatus including a continuously rotating arm, a gripping unit carried by the arm, a vertically movable shoe adapted to be engaged by said gripping unit, said shoe being of sufficient length to permit cooperation with the gripper unit while the latter continues to travel, and means for moving the shoe to open the grippers during the continued rotation of said arm.

6. A transfer apparatus including a continuously rotating arm, a gripping unit carried by the arm, a vertically movable shoe adapted to be engaged by said gripping unit, said shoe being of sufficient length to permit cooperation with the gripper unit while the latter continues to travel, and means for moving the shoe to lower the grippers bodily and then open them during the continued rotation of said arm.

7. A transfer apparatus including a continuously rotating arm, a gripping unit carried by the arm, a vertically movable shoe adapted to be engaged by said unit, means for lifting the shoe to close the grippers, and a horizontal track for retaining the grippers closed.

8. A transfer apparatus including a continuously rotating arm, a gripping unit carried by the arm, a horizontal track for retaining the grippers in closed position, and a vertically movable shoe for opening the grippers.

9. A transfer apparatus including a continuously rotating arm, a gripping unit carried by the arm, a vertically movable shoe adapted to be engaged by said unit, means for moving the shoe for closing the grippers, a horizontal track for retaining the grippers in closed position, and a vertically movable shoe for opening the grippers.

10. A transfer apparatus including a continuously rotating member, a plurality of gripping units carried by said member, a plurality of cylinders for operating the gripping units, two of said cylinders being simultaneously operable in opposite directions, whereby one gripping unit is being closed while another is being opened, the opening and closing operations being effected during the continued rotation of said member.

11. A transfer apparatus including a continuously rotating member, two gripping units mounted on said member, two vertically movable shoes arranged in the path of the gripping units and adapted to be engaged thereby, and means for simultaneously moving the shoes in opposite directions.

12. A transfer apparatus including a continuously rotating member, two gripping units mounted on said member, two vertically movable shoes arranged in the path of the gripping units and adapted to be engaged thereby, and two cylinders for simultaneously moving the shoes in opposite directions.

13. A transfer apparatus including a continuously revolving member, two gripping units mounted on said member, two vertically movable shoes, a stationary track arranged between the two shoes, one of said shoes adapted to lift one of the gripping units to engage the track, and the other of said shoes adapted to simultaneously lower the other of said gripping units from the track.

14. A transfer apparatus including a rotatable arm, a rod mounted for vertical movement in the arm, grippers carried by the rod, a roller carried by the rod, a shoe adapted to be engaged by the roller, a horizontal track, and means for lifting the shoe and roller to the level of said track.

15. A transfer apparatus including a rotatable arm, a tubular member secured to the arm, a sleeve slidably mounted on the tubular member, a pair of grippers, a pin for pivotally attaching the grippers to the sleeve, a rod mounted in the tubular member, said rod having a slot therein to receive said pin, the grippers also pivotally attached to the rod, a roller carried by the rod, a shoe adapted to be engaged by the roller, means for lifting the shoe to first close the grippers and then lift them bodily, and a horizontal track for retaining the grippers in closed and elevated position.

16. A transfer apparatus including a continuously rotating member, four gripping units carried thereby, a semi-circular horizontal track, a vertically movable shoe at each end of said track and adapted to be engaged by the gripping units, one of said shoes closing and lifting each gripping unit during the continued rotation thereof, said track retaining the gripping units in closed and elevated positions, and the other of said shoes lowering and opening each gripping unit during the continued rotation thereof.

17. A transfer apparatus including a pair of grippers, adjustable means carried by the grippers for determining the extent of closing of the grippers, and said means also guiding the grippers into proper alignment.

18. A transfer apparatus including a pair of grippers, an inwardly projecting member carried by each gripper, said inwardly projecting member constructed to guide the grippers into proper alignment.

19. A transfer apparatus including a pair of grippers, an inwardly projecting pin carried by each gripper, the ends of the pins constructed to guide the grippers into proper alignment.

20. A transfer apparatus for glassware including a continuously revolving shaft, a plurality of gripping units carried by the shaft, cylinders for opening and closing the grippers, a track for maintaining the grippers closed, and means for vertically adjusting the shaft and gripping units carried thereby to suit ware of different height.

21. A transfer apparatus for glassware including a continuously revolving shaft, a plurality of gripping units carried by the shaft, cylinders for opening and closing the grippers, a track for maintaining the grippers closed, means for vertically adjusting the shaft and gripping units carried thereby to suit ware of different height, and means carried by each pair of grippers to adjustably determine the extent of closing of the grippers to suit ware of different diameter.

THOMAS STENHOUSE.
DAVID STENHOUSE.